A. G. McPHERSON.
STEERING WHEEL.
APPLICATION FILED NOV. 16, 1907.
963,240. Patented July 5, 1910.
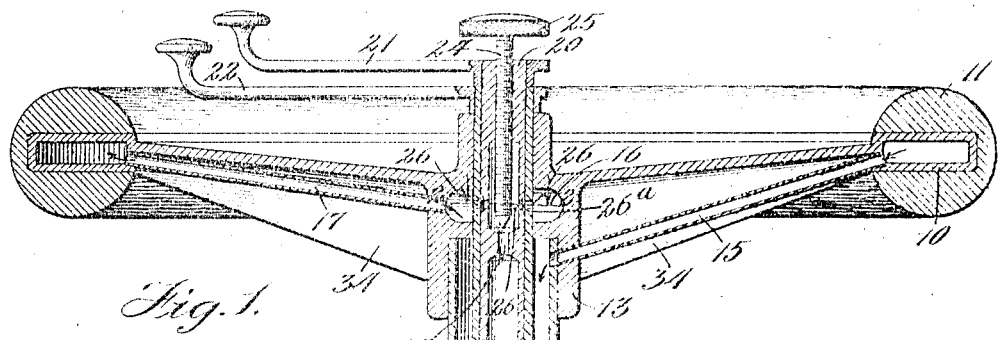
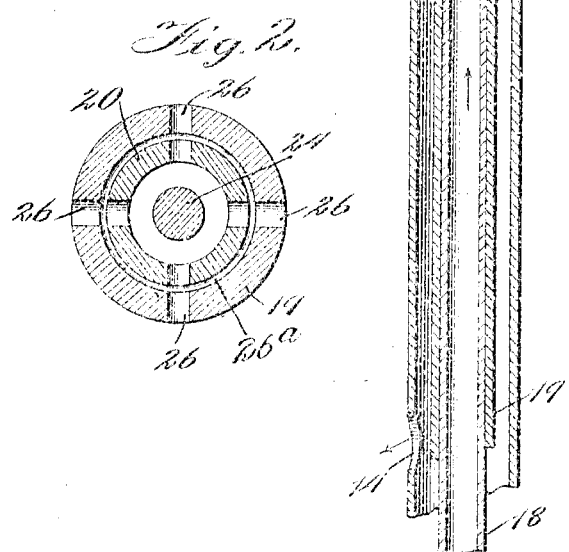
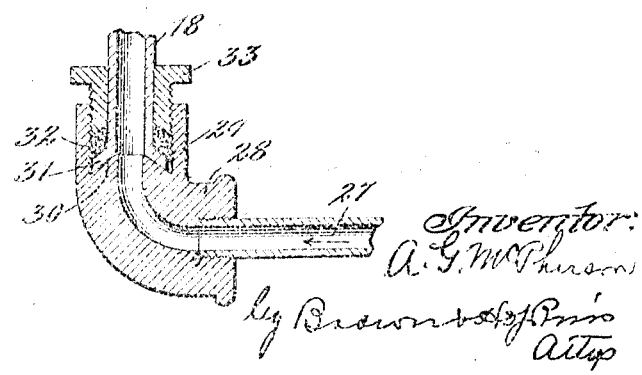

UNITED STATES PATENT OFFICE.

ARTHUR G. McPHERSON, OF HIGHLAND PARK, ILLINOIS.

STEERING-WHEEL.

963,240.  Specification of Letters Patent.   Patented July 5, 1910.

Application filed November 18, 1907. Serial No. 402,665.

*To all whom it may concern:*

Be it known that I, ARTHUR G. MCPHERSON, a citizen of the United States, residing at Highland Park, county of Lake, and State of Illinois, have invented certain new and useful Improvements in Steering-Wheels, of which the following is a specification.

This invention relates to improvements in steering wheels particularly adapted for use with motor vehicles and the like, and the primary object of the same is to provide an improved wheel of this character so constructed that the wheel is adapted to receive a heating fluid whereby the wheel may be heated.

A further object is to provide improved means for regulating the supply for heating fluid to the wheel whereby the temperature of the wheel may be regulated or controlled.

A further object is to provide an improved device of this character which is simple, durable and cheap in construction, and efficient and effective in operation.

To the attainment of these ends and the accomplishment of other new and useful objects, as will appear, the invention consists in the features of novelty in the construction, combination and arrangement of the several parts hereinafter more fully described and claimed and shown in the accompanying drawing, illustrating an exemplification of the invention and in which—

Figure 1 is a detail sectional view, partly broken away, of an improved device of this character constructed in accordance with the principles of this invention. Fig. 2 is a detail sectional view on line 2—2 of Fig. 1.

Referring more particularly to the drawing, the numeral 10 designates the rim of the wheel which may be constructed of any suitable material, such as metal, and is hollow to form a fluid chamber, and 11 designates a suitable heat insulating covering for the chamber which may be constructed of any suitable material, such as wood or other nominal non-conductor of heat. The wheel is supported and held in position by means of a hollow steering shaft 12, the upper extremity of which is secured to the hub 13 of the wheel and is adapted to be rotated by the wheel in the ordinary manner to steer the vehicle. The shaft 12 is supported in the usual manner, not necessary to illustrate, and is provided with an aperture 14 extending through the side thereof at any suitable point throughout its length. Arranged between the upper end of the shaft 12 and the rim or chamber 10 is a tubular member or pipe 15 which forms a communication between the shaft 12 and the chamber 10. The hub 13 of the wheel is provided with a chamber 16, which is preferably located above and out of communication with the shaft 12 and a pipe or tube 17 is arranged to form communication between the chamber or rim 10 and the chamber 16.

Arranged to extend through the shaft 12 is a throttle shaft 18 and a sparker shaft 19 which telescope with each other and the throttle shaft 18 is hollow with the upper extremity 20 thereof closed in any suitable manner. The throttle shaft 18 preferably extends beyond the extremity of the sparker shaft 19 and secured to the extremities of these shafts are the ordinary operating arms 21, 22, which are located adjacent the steering wheel, as usual. The throttle shaft 18 is provided with a valve seat 23 located a short distance beyond the closed extremity 20, and adjacent the chamber 16 of the steering wheel, and a suitable valve 24, preferably in the form of a screw threaded member, is provided for controlling the valve opening. This valve is preferably mounted to extend through the closed extremity 20 of the throttle shaft and is provided with a suitable operating head or handle 25, by means of which the valve may be adjusted to open or close the valve opening 23. The throttle and sparker shafts are provided with registering apertures 26, which form communication between the chamber 16 in the hub 13 of the steering wheel and the throttle shaft 18 above the valve seat or opening 23.

The throttle shaft 18 may be connected with any suitable source of heated fluid supply but in the present exemplification of the invention it is shown as being connected with a suitable pipe 27, which leads from the exhaust port of the engine so that the exhaust vapor or fluid therefrom will pass into the throttle shaft 18 and when the valve 24 is unseated, as shown in the figure, the fluid will pass through the valve opening and be discharged into the chamber 16 in the hub 13 of the steering wheel through the apertures 26, and will pass from the chamber 16 through the pipe or tube 17 and into the rim or chamber 10. The fluid will make its escape from this chamber through the tube or pipe 15 into the tubular steering shaft 12 outside of the throttle shaft 18 and will make its escape from the shaft 12 through the aperture 14. Thus it will be seen that when the valve 24 is unseated, the fluid will circulate through the steering wheel in the direction indicated by the arrows and when it is desired to regulate the supply, the valve 24 may be accordingly adjusted. With this construction it will be seen that the operation of the throttle and sparker shafts will not be interfered with.

Any suitable means may be provided for connecting the pipe 27 which leads from the engine to the throttle shaft 18. A suitable and efficient means for accomplishing this purpose comprises a coupling 28 to which one end of the shaft 27 is connected. The other end of the coupling is provided with a suitable threaded recess 29 having a seat 30 therein, upon which latter the flared extremity 31 of the throttle shaft 18 is adapted to rest. Suitable packing material 32 may be placed within the recess 29 upon the extremity 31 of the throttle shaft; and a nut or bushing 33 provided with exterior screw threads adapted to engage the threads in the recess 29 may be employed for preventing displacement of the parts, and yet allow the steering shaft 12 to be rotated with respect to the coupling.

Obviously any other fluid may be employed for heating the steering wheel, such for instance as the water which is used to cool the engine and which has become heated. In this event the pipe 27 instead of leading from the exhaust port of the engine may be connected to the outlet of the cooling chamber of the engine.

If desired, the wheel may be provided with a web 34 for protecting the pipes or tubes 15 and 17, and in order to prevent the apertures 26 in the sparker and throttle shafts from being closed when the shafts are rotated with respect to each other, one of the shafts, preferably the throttle shaft 18, is provided with a circumferential groove 26ª which communicates with the apertures 26 and is always in register with the apertures 26 in the sparker shaft.

In order that the invention might be fully understood by those skilled in the art, the details of the foregoing embodiment thereof have been thus specifically described but What I claim as new and desire to secure by Letters Patent is—

1. The combination with a tubular steering shaft, of a steering wheel rigidly secured thereto, said wheel being provided with fluid chambers in its rim and hub portions and with a passage connecting said chambers, a smaller tubular shaft mounted within and forming an annular space in said steering shaft, said smaller tubular shaft discharging into said hub fluid chamber, and a tubular connection between said annular space and the rim fluid chamber.

2. The combination of a tubular shaft, a steering wheel secured thereto, said wheel being provided with a hollow rim and a hub fluid chamber in communication with the hollow rim, a smaller tubular shaft concentrically arranged within the first said tubular shaft to provide an annular passage for fluid, said smaller shaft being provided with a valved passage in communication with said hub fluid chamber and a valve mounted in the end of said smaller shaft and coaxial therewith, said valve being movable axially to control said passage.

3. The combination of a plurality of tubular shafts concentrically arranged, the innermost being provided with a valved passage and the outermost having its walls spaced from the next smaller to form an annular channel, a hollow rimmed steering wheel rigidly secured to the outermost shaft, said wheel being provided with a hub having a fluid chamber therein and said innermost shaft being provided with a continuously open passage into said hub fluid chamber, a tube connecting said fluid chamber with the hollow rim and another tube connecting the hollow rim with the annular channel within the outermost shaft, the wall of said outermost shaft being provided with an aperture whereby said annular channel is placed in communication with the atmosphere.

4. A steering wheel provided with a fluid chamber therein having an inlet passage and an outlet passage, a tubular throttle shaft connected to the inlet for supplying a heating fluid to the chamber, and a valve adjustable axially of said throttle shaft for controlling one of the passages to regulate the supply of fluid to the chamber.

5. The combination with a tubular steering shaft and a steering wheel rigidly secured thereto, said wheel being provided with a hollow rim, a fluid chamber in the hub thereof and a tube connecting said chamber to the hollow rim, of a tubular steering shaft upon which said wheel is mounted, a smaller tubular shaft arranged within the steering shaft and forming an annular passageway for fluid between the walls of said shafts, said smaller shaft being provided with a valved outlet discharging into the hub fluid chamber, and a tube connecting the hollow rim with said annular passageway independently of said hub fluid chamber.

6. The combination of a tubular shaft, a hollow steering wheel rigidly secured thereto, a smaller tubular shaft arranged to provide an annular passage for fluid within the first said shaft, said smaller shaft being rotatable relatively to the larger shaft and provided with a passage in communication with said hollow wheel, and a valve movable axially to control said passage.

7. The combination of a steering wheel provided with a hub and having a fluid chamber in its rim, a tubular steering shaft connected to the hub and having communication with the chamber for receiving the fluid discharged from the chamber, a chamber within the hub, said chamber having communication with the chamber in the rim of the wheel, and a tubular member within and spaced from the steering shaft and movable independently with respect thereto, said member having a source of fluid supply and discharging into the chamber in the hub, means for controlling the discharge outlet of the said tubular member and means for moving the said member.

In testimony whereof I have signed my name to this specification, in the presence of two subscribing witnesses, on this 15th day of November A. D. 1907.

ARTHUR G. McPHERSON.

Witnesses:
M. W. CANTWELL,
FRANCIS A. HOPKINS.